United States Patent Office 2,936,305
Patented May 10, 1960

2,936,305
WATER-INSOLUBLE DISAZO DYESTUFFS

Willy Forter, Neu-Allschwil, and Fritz Kehrer, Basel, Switzerland, assignors to Sandoz A.G., Basel, Switzerland No Drawing. Application November 14, 1957
Serial No. 696,308

Claims priority, application Switzerland
November 29, 1956

6 Claims. (Cl. 260—175)

The invention herewith disclosed relates to new water-insoluble disazo dyestuffs having the general formula

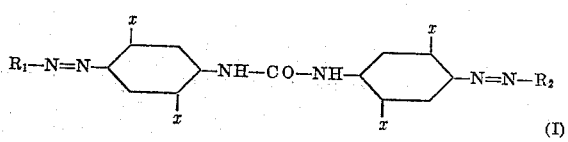

wherein $x$ stands for hydrogen, methyl, ethyl, methoxy, ethoxy or halogen, and $R_1$ and $R_2$ for identical or different radicals of azo components which are free from water-solubilizing substituents and are coupled in the ortho-position to a phenolic or enolic hydroxy group, and wherein, when the $x$ standing in ortho-position to the azo group represents methoxy or ethoxy, the ortho-ortho'-hydroxy-methoxy- or -ethoxyazo grouping may be closed with copper or nickel.

These water-insoluble disazo dyestuffs are obatined by coupling 1 mol of the tetrazo compound of a diamine of the general formula

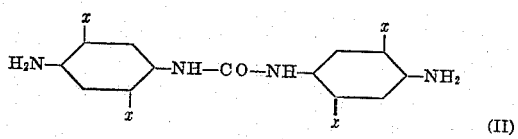

wherein $x$ stands for hydrogen, methyl, ethyl, methoxy, ethoxy or halogen, or a mixture of two or more diamines of the same description with 2 mols of an azo component which is free from water-solubilizing substituents and couples in ortho-position to a phenolic or enolic hydroxy group or with 2 mols of a mixture of two or more azo components of the same type. When the $x$ standing in ortho-position to the amino group represents methoxy or ethoxy, the resultant disazo dyestuff may be converted into the copper or nickel complex compound by treatment with a copper- or nickel-yielding agent.

Examples of diamines of general Formula II which are suitable for the process are 4.4'-diamino-1.1'-diphenylurea, 4.4'-diamino-3.3'-difluoro-, -dichloro- or -dibromo-1.1'-diphenylurea, 4.4'-diamino-2.2', 5.5'-tetrachloro-, -tetrabromo- or -tetrafluoro-1.1'-diphenylurea, 4.4'-diamino-2.2', 5.5'-tetramethyl-, -tetra-ethyl-, -tetramethoxy- or -tetra-ethoxy-1.1'-diphenylurea, 4.4'-diamino-3.3'-dimethoxy- or -diethoxy-1.1'-diphenylurea, 4.4'-diamino-2.2'-dimethoxy-5.5'-dimethyl-1.1' - diphenylurea, 4.4'-diamino-2.2'-dichloro-5.5' - dimethoxy - 1.1' - diphenylurea, 4.4'-diamino-2.2'-dimethyl- or -diethyl-1.1'-diphenylurea.

Suitable azo components are e.g. 2-hydroxynaphthalene-3-carboxylic acid amide and its derivatives substituted on the nitrogen of the amide by alkyl, cycloalkyl, aralkyl or aryl radicals, 1-aryl-3-methyl-5-pyrazolones and acetoacetylaminobenzenes or acetoacetylaminonaphthalenes. The 2-hydroxynaphthalene-3-carboxylic acid aryl amides, the 1-aryl-3-methyl-5-pyrazolones and the acetoacetylaminobenzenes or -naphthalenes may contain in the aryl radical further water-insoluble substituents such as halogen atoms, cyano, nitro, alkyl or alkoxy groups.

The diamine is tetrazotized in cold hydrochloric acid solution by slow dropwise addition of a sodium nitrite solution.

The tetrazo compound can be coupled with the azo component in an acetic acid, neutral, soda-alkaline or caustic-alkaline medium at 10° C., if desired with the addition of pyridine.

It is of advantage to subject the dyestuffs to further mechanical treatment in suitable machines such as grinding or roller mills in presence of dispersing agents, e.g. condensation products of napththalene-sulfonic acids with formaldehyde, to give commercial pigment pastes. The pastes can be converted into powders by a suitable drying process, for example spray drying, and the powder again ground in suitable equipment if desired.

The new dyestuffs are insoluble or sparingly soluble in the common solvents. Their uses include the dyeing of paper furnishes in the beater, the mass coloration of man-made fibers, the printing of textiles and paper, and the pigmentation of synthetic resins, lacquers and emulsion paints. In heavy concentrations they are characterized by outstanding fastness to light and good to very good fastness to washing, perspiration, cross-dyeing, peroxide bleaching, dry cleaning, and blind vats.

The following examples illustrate the invention. The parts and percentages are by weight and the temperatures are in degrees centigrade.

EXAMPLE 1

36.2 parts of 4.4'-diamino-2.2',5.5'-tetramethoxy-1.1'-diphenylurea are stirred into 400 parts of water and 50 parts of 30% hydrochloric acid at room temperature. After 15 minutes' agitation the solution is cooled to 0° upon which a solution of 13.8 parts of sodium nitrite and 50 parts of water is added by degrees over 30 minutes. The resultant tetrazo solution is filtered and united with a solution of 52.6 parts of 2-hydroxynaphthalene-3-carboxylic acid-phenylamide in 200 parts of alcohol, 300 parts of water and 60 parts of 30% sodium hydroxide solution at 10°. On completion of coupling the precipitated dyestuff is separated, washed neutral and dried. It is a brown-black powder which is practically insoluble in water and standard organic solvents at room temperature. It dissolves in concentrated sulfuric acid with a blue coloration; when this solution is poured into water at about 20° the dyestuff is obtained in finely divided form.

To convert the dyestuff into a pigment preparation suitable for practical use the crude, neutral-washed filter cake is ground in a suitable machine such as a ball or roller mill with the sodium salt of dinaphthylmethane-disulfonic acid and, if desired, water until the required particle size is obtained. The pigment paste thus formed can be employed as such for printing textile materials and dyeing paper furnishes and viscose spinning solution. In these applications it gives navy blue shades of very good fastness. Alternatively, the paste can be dried in suitable equipment, e.g. a spray drier, to give a pigment powder.

The water-insoluble disazo dyestuff can be converted into the copper complex compound as follows:

9.1 parts of the above dyestuff are added to a concentrated solution of140 parts of sodium acetate, 30 parts of water, 20 parts of diethanolamine and 10 parts of crystalline copper sulfate at 80° with stirring. The mass is heated to 95° and held at this temperature for 2 hours. Then the temperature is raised to 105° and coppering is allowed to proceed at this temperature for 16 hours. After this time 250 parts of hot water are run into the solution, and the precipitated copper-containing dyestuff is filtered off, washed with water and dried. Upon grinding it is obtained as a black powder which is practically insoluble in water and in the common organic solvents.

2 parts of a 20% aqueous paste of the pigment powder obtained as described in the preceding paragraph are added to 235 parts of an aqueous sodium cellulose-xanthogenate solution with a content of 20 parts of a α-cellulose at 10–15°. The mass is stirred for 15 minutes by means of a mechanical agitator in order to obtain a homogeneous dispersion of the pigment in the viscose solution. The colored mass is left standing overnight at 4° to allow the trapped air to escape. Next day it is pumped through a spinneret into a sulfuric acid spinning bath in the normal way. The viscose rayon filament is reeled, desulfurized, washed, rinsed and dried. It is dyed an intense blue which is outstandingly fast to light, washing, chlorination, cross-dyeing, and blind vats.

EXAMPLE 2

36.2 parts of 4.4'-diamino-2.2',5.5'-tetramethoxy-1.1'-diphenylurea are tetrazotized according to the particulars of Example 1. The tetrazo solution is filtered and united with a solution of 37.4 parts of 2-hydroxynaphthalene-3-carboxylic acid-amide in 300 parts of water, 75 parts of alcohol, 75 parts of 30% sodium hydroxide solution and 10 parts of pyridine at 10°. On completion of coupling the precipitated dyestuff is filtered off, washed neutral and dried. The pigment thus obtained dyes polyvinyl chloride in dark blue shades of very good fastness to migration.

0.1 part of the disazo dyestuff produced according to the present example is moistened with dioctyl phthalate and mixed with 100 parts of a polyvinyl chloride mass containing a plasticizer. The colored mass is gelatinized with friction on a roller mill for 10 minutes at approximately 140–150°, and the film peeled off. It is colored in a fast-to-light navy shade which is outstandingly fast to migration.

EXAMPLE 3

36.2 parts of 4.4'-diamino-2.2',5.5'-tetramethoxy-1.1'-diphenylurea are tetrazotized as described in Example 1. The tetrazo solution is filtered and united with 250 parts of a 20% sodium carbonate solution and a solution of 20.85 parts of 1-(3'-chloro)-phenyl-3-methyl-5-pyrazolone and 26.3 parts of 2-hydroxynaphthalene-3-carboxylic acid-phenylamide in 400 parts of pyridine, 300 parts of alcohol, 300 parts of water and 10 parts of 30% sodium hydroxide solution at 10°. On completion of coupling the precipitated dyestuff is filtered and washed neutral. The pigment preparation obtained in the way described in Example 1 dyes viscose spinning solutions in blue-black shades.

When the 36.2 parts of 4.4'-diamino-2.2',5.5'-tetramethoxy-1.1'-diphenylurea of the present example are replaced by a mixture of 18.1 parts of 4.4'-diamino-2.2',5.5'-tetramethoxy-1.1'-diphenylurea and 20.9 parts of 4.4'-diamino-2.2',5.5'-tetra-ethoxy-1.1'-diphenylurea or by a mixture of 15.1 parts of 4.4'-diamino-5.5'-dimethoxy-1.1'-diphenylurea and 16.5 parts of 4.4'-diamino-2.2'-dimethoxy-5.5'-dimethyl-1.1'-diphenylurea, dyestuff mixtures are obtained which can be worked up to pigment preparations suitable for producing blue-black spun-dyed shades in viscose with good light and washing fastness.

EXAMPLE 4

33 parts of 4.4'-diamino-2.2'-dimethoxy-5.5'-dimethyl-1.1'-diphenylurea are tetrazotized as described in Example 1. At the same time 54.3 parts of 1-acetoacetylamino-2.5-dimethoxy-4-chlorobenzene are dissolved in 800 parts of water and 40 parts of 30% sodium hydroxide solution at 30°. This solution is filtered, given 15 parts of glacial acetic acid and 50 parts of crystalline sodium acetate, and combined at 30° with the filtered tetrazo solution. On completion of coupling the reaction mass is heated to 60° and maintained at this temperature for 2 hours. Then the precipitated dyestuff is filtered off with suction and washed with water. An orange pigment preparation is produced from it by the procedure detailed in Example 1; applied in viscose spinning solutions it gives orange shades.

EXAMPLE 5

41.8 parts of 4.4'-diamino-2.2',5.5'-tetra-ethoxy-1.1'-diphenylurea are tetrazotized according to Example 1. The tetrazo solution is filtered and run slowly into a solution of 41.7 parts of 1-(3'-chloro)-phenyl-3-methyl-5-pyrazolone, 100 parts of alcohol, 300 parts of water and 25 parts of 30% sodium hydroxide solution at 10°, with simultaneous addition of 75 parts of a 10% sodium hydroxide solution. On completion of coupling the precipitated dyestuff is filtered off and washed neutral with water. It is processed as described in Example 1; the resultant pigment preparation is suitable for spin-dyeing viscose in red shades.

EXAMPLE 6

38 parts of 4.4'-diamino-2.2',5.5'-tetrachloro-1.1'-diphenylurea are stirred with 400 parts of water and 50 parts of 30% hydrochloric acid for 15 minutes at room temperature. The solution is cooled to 0° and chaged with a solution of 13.8 parts of sodium nitrite and 50 parts of water, added gradually over 30 minutes. At the same time 54.3 parts of 1-acetoacetylamino-2.5-dimethoxy-4-chlorobenzene are dissolved in 800 parts of water and 45 parts of 30% sodium hydroxide solution at 30°; this solution is filtered, made up with 12 parts of glacial acetic acid and 50 parts of crystalline sodium acetate, and united at 30° with the filtered tetrazo solution. When the coupling reaction is completed the reaction mixture is heated to 60° and held at this temperature for 2 hours. The precipitated dyestuff is then filtered off with suction and washed with water. It is a yellow powder which is practically insoluble in water and the common organic solvents at room temperature. It is soluble in concentrated sulfuric acid, giving a yellow-colored solution which is poured into water at about 20° to reprecipitate the product in finely divided form. On suitable treatment a pigment preparation is obtained which gives fast yellow shades in spun-dyed viscose.

EXAMPLE 7

27.8 parts of 4.4'-diamino-3.3'-difluoro-1.1'-diphenylurea are tetrazotized according to the details of Example 6. The tetrazo solution is filtered and united with a solution of 52.6 parts of 2-hydroxynaphthalene-3-carboxylic acid-phenylamide in 200 parts of alcohol, 300 parts of water and 60 parts of 30% sodium hydroxide solution at 10°. On completion of coupling the precipitated dyestuff is separated and washed neutral. It is a dark-colored powder, practically insoluble in water and the common organic solvents. Converted into a pigment preparation, it is used in viscose spin-dyeing to give bordeaux-red shades.

In place of the 27.8 parts of 4.4'-diamino-3.3'-difluoro-1.1'-diphenylurea, a mixture of 13.9 parts of 4.4'-diamino-1.1'-diphenylurea, a mixture of 13.9 parts of 4.4'-diamino-3.3'-difluoro-1.1'-diphenylurea and 15.55 parts of 4.4'-diamino-3.3'-dichloro-1.1'-diphenylurea or a mixture of 15.55 parts of 4.4'diamino-3.3'-dichloro-1.1'-diphenylurea and 19 parts of 4.4'-diamino-2.2',5.5'-tetrachloro-1.1'-diphenylurea may be used.

The following tables enumerate further water-insoluble disazo dyestuffs of the general Formula I which are obtainable according to the methods described in Examples 1 to 7. In Table 1 they are characterized by the tetrazo and the azo components and by the shade of the dyeings on viscose. In Table 2 they are delineated by the tetrazo component, the two azo components and their molecular ratio, and by the shade in spun-dyed viscose.

Table 1

| Example No. | Tetrazo Component | Coupling Component | Shade in Spun-Dyed Viscose |
|---|---|---|---|
| 8 | 4.4'-diamino-2.2',5.5'-tetramethoxy-1.1'-diphenylurea. | 2-hydroxynaphthalene-3-carboxylic acid-(2'-methoxy)-phenylamide. | blue. |
| 9 | ----do---- | 2-hydroxynaphthalene-3-carboxylic acid-(2'.5'-dimethoxy)-phenylamide. | Do. |
| 10 | ----do---- | 2-hydroxynaphthalene-3-carboxylic acid-(2'.4'-dimethoxy-5'-chloro)-phenylamide. | Do. |
| 11 | ----do---- | 2-hydroxynaphthalene-3-carboxylic acid-(2'-methyl)-phenylamide. | Do. |
| 12 | ----do---- | 2-hydroxynaphthalene-3-carboxylic acid-(2'-methyl-4'-chloro)-phenylamide. | Do. |
| 13 | ----do---- | 2-hydroxynaphthalene-3-carboxylic acid-(3'-nitro)-phenylamide. | Do. |
| 14 | ----do---- | 2-hydroxynaphthalene-3-carboxylic acid-(2')-naphthylamide. | Do. |
| 15 | ----do---- | acetoacetylaminobenzene. | yellow. |
| 16 | ----do---- | 1-acetoacetylamino-2-methoxybenzene. | Do. |
| 17 | ----do---- | 1-acetoacetylamino-2.5-dimethoxy-4-chlorobenzene. | orange. |
| 18 | ----do---- | 1-phenyl-3-methyl-5-pyrzaolone. | red. |
| 19 | ----do---- | 1-(3'-chloro)-phenyl-3-methyl-5-pyrazolone. | Do. |
| 20 | ----do---- | 1-(3'-cyano)-phenyl-3-methyl-5-pyrazolone. | Do. |
| 21 | 4.4'-diamino-2.2',5.5'-tetra-ethoxy-1.1'-diphenylurea. | 2-hydroxynaphthalene-3-carboxylic acid-phenylamide. | blue. |
| 22 | ----do---- | 2-hydroxynaphthalene-3-carboxylic acid-amide. | Do. |
| 23 | ----do---- | 2-hydroxynaphthalene-3-carboxylic acid-(2'.5'-dimethoxy)-phenylamide. | blue-green. |
| 24 | ----do---- | 1-acetoacetylamino-2.5-dimethoxy-4-chlorobenzene. | orange. |
| 25 | 4.4'-diamino-2.2'-dimethoxy-5.5'-dimethyl-1.1'diphenylurea. | 2-hydroxynaphthalene-3-carboxylic acid-phenylamide. | blue. |
| 26 | ----do---- | 1-(3'-chloro-)-phenyl-3-methyl-5-pyrozolone. | red. |
| 27 | 4.4'-diamino-5.5'-dimethoxy-1.1'-diphenylurea. | 2-hydroxynaphthalene-3-carboxylic acid-phenylamide. | blue. |
| 28 | ----do---- | 1-acetoacetylamino-2.5-dimethoxy-4-chlorobenzene. | yellow. |
| 29 | ----do---- | 1-(3'-chloro)-phenyl-3-methyl-5-pyrozolone. | orange. |
| 30 | 4.4'-diamino-1.1'-diphenylurea. | 2-hydroxynaphthalene-3-carboxylic acid-phenylamide. | violet. |
| 31 | 4.4'-diamino-2.2',5.5'-tetramethyl-1.1'-diphenylurea. | ----do---- | blue. |
| 32 | 4.4'-diamino-2.2'-dimethyl-1.1'-diphenylurea. | ----do---- | Do. |
| 33 | 4.4'-diamino-2.2'-diethyl-1.1'-diphenylurea. | ----do---- | Do. |
| 34 | 4.4'-diamino-2.2',5.5'-tetrachloro-1.1'-diphenylurea. | 2-hydroxynaphthalene-3-carboxylic acid-amide. | Do. |
| 35 | 4.4'-diamino-2.2'-dichloro-5.5'-dimethoxy-1.1'-diphenylurea. | 1-acetoacetylamino-2-methoxybenzene. | yellow. |
| 36 | 4.4'-diamino-3.3'-dichloro-1.1'-diphenylurea. | 1-(3'-chloro)-phenyl-3-methyl-5-pryazolone. | orange. |
| 37 | 4.4'-diamino-3.3'-difluoro-1.1'-diphenylurea. | 1-acetoacetylamino-2.5-dimethoxy-4-chlorobenzene. | yellow. |
| 38 | 4.4'-diamino-3.3'-dibromo-1.1'-diphenylurea. | ----do---- | Do. |
| 39 | 4.4'-diamino-2.2'-dichloro-5.5'-dimethyl-1.1'-diphenylurea. | 2-hydroxynaphthalene-3-carboxylic acid-methylamide. | violet. |
| 40 | ----do---- | 2-hydroxynaphthalene-3-carboxylic acid-cyclohexylamide. | Do. |
| 41 | 4.4'-diamino-2.2-5.5'-tetramethoxy-1.1'-diphenylurea. | 2-hydroxynaphthalene-3-carboxylic acid-N-methyl-N-phenylamide. | blue. |
| 42 | ----do---- | 2-hydroxynaphthalene-3-carboxylic acid-propylamide. | Do. |
| 43 | 4.4'-diamino-2.2',5.5'-tetrachloro-1.1'-diphenylurea. | 2-hydroxynaphthalene-3-carboxylic acid,benzylamide. | Do. |
| 44 | ----do---- | 2-hydroxynaphthalene-3-carboxylic acid-dimethylamide. | Do. |
| 45 | ----do---- | 1-acetoacetylamino-naphthalene. | yellow. |
| 46 | 4.4'-diamino-2.2',5.5'-tetramethoxy-1.1'-diphenylurea. | 1-acetoacetylamino-2.3-tetramethylene-benzene. | Do. |

Table 2

| Example No. | Tetrazo Component | 1st Azo Component | 2nd Azo Component | Molecular Ratio | Shade in Spun-Dyed Viscose |
|---|---|---|---|---|---|
| 47 | 4.4'-diamino-2.2',5.5'-tetrachloro-1.1'-diphenylurea. | 2-hydroxynaphthalene-3-carboxylic acid-phenylamide. | 1-phenyl-3-amino-5-pyrazolone. | 1:1 | bordeaux. |
| 48 | 4.4'-diamino-3.3'-dichloro-1.1'-diphenylurea. | 2-hydroxynaphthalene-3-carboxylic acid-(2'-methoxy)-phenylamide. | 1-(4'-chloro)-phenyl-3-methyl-5-pyrazolone. | 9:1 | violet. |
| 49 | 4.4'-diamino-3.3'-difluoro-1.1'-diphenylurea. | 1-acetoacetylamino-4-chlorobenzene. | 1-acetoacetylamino-4-fluorobenzene. | 1:1 | yellow. |
| 50 | 4.4'-diamino-2.2'-dichloro-5.5'-dimethoxy-1.1'-diphenylurea. | 1-acetoacetylamino-2.5-dimethoxy-4-chlorobenzene. | 1-(4'-chloro)-phenyl-3-methyl-5-pyrazolone. | 2:8 | orange. |
| 51 | 4.4'-diamino-2.2'-dimethoxy-5.5'-dimethyl-1.1'-diphenylurea. | 2-hydroxynaphthalene-3-carboxylic acid-phenylamide. | 1-acetoacetylamino-2.5-dimethoxy-4-chlorobenzene. | 1:1 | blue-green. |
| 52 | 4.4'-diamino-2.2',5.5'-tetramethoxy-1.1'-diphenylurea. | ----do---- | ----do---- | 1:2 | green. |
| 53 | ----do---- | ----do---- | 1-naphthyl(1')-3-methyl-5-pyrazolone. | 9:1 | navy blue. |
| 54 | 4.4'-diamino-2.2',5.5'-tetraethoxy-1.1'-diphenylurea. | 2-hydroxynaphthalene-3-carboxylic acid-(2'.4'-dimethoxy-5'-chloro)-phenylamide. | 1-naphthyl(2')-3-methyl-5-pyrazolone. | 9.4:0.6 | Do. |
| 55 | 4.4'-diamino-2.2',5.5'-tetramethoxy-1.1'-diphenylurea. | 2-hydroxynaphthalene-3-carboxylic acid-(3'-chloro)-phenylamide. | 2-hydroxynaphthalene-3-carboxylic acid-(4'-methyl)-phenylamide. | 1:1 | blue. |
| 56 | ----do---- | ----do---- | 2-hydroxynaphthalene-3-carboxylic acid-phenylamide. | 1:2 | Do. |
| 57 | 4.4'-diamino-2.2',5.5'-tetrachloro-1.1'-diphenylurea. | 2-hydroxynaphthalene-3-carboxylic acid-cyclohexylamide. | ----do---- | 1:1 | violet. |

EXAMPLE 58

Cellulose acetate is dyed as follows: 10 parts of the dry disazo dyestuff obtained according to Example 22 are ground with 10 parts of Cellite (secondary cellulose acetate) and 160 parts of acetone in a ball mill until the desired degree of fineness is achieved. The suspension is run into water, and the product filtered off, washed with water and dried.

The pigment preparation thus obtained is applied to cellulose acetate spinning solutions to give filaments of greenish blue shade. The dyeings have excellent fastness to light, washing, cross-dyeing, alkaline chlorination, oxalic acid, peroxide bleaching, hydrosulfite, gas fumes, and dry cleaning.

EXAMPLE 59

Paper is dyed as follows: 2 parts of a 10% aqueous paste of the pigment produced according to Example 21 are added to a furnish of 100 parts of bleached sulfite cellulose and 2000 parts of water in the beater. 40 parts of a 2.5% rosin milk are added, followed by 40 parts of a 5% aluminum sulfate solution, to size the paper and bind the pigment to the fibers. The finished paper is dyed in a medium-depth blue shade which has good fastness to light and gas fumes.

EXAMPLE 60

A typical printing method for textile fabrics is as follows: A paste consisting of 100 parts of a 20% aqueous paste of the pigment preparation obtained according to Example 8, 400 parts of tragacanth 3%, 400 parts of a 50% aqueous solution of egg albumin and 100 parts of a non-ionic wetting agent is printed on the fabric. The print is dried and steamed at 100–101° for half an hour.

In place of tragacanth and egg albumin the printing paste may be prepared with one of the binders commonly used for pigment prints, e.g. those based on synthetic resins.

Formulae of representative dyestuffs of the foregoing examples are as follows:

EXAMPLE 1

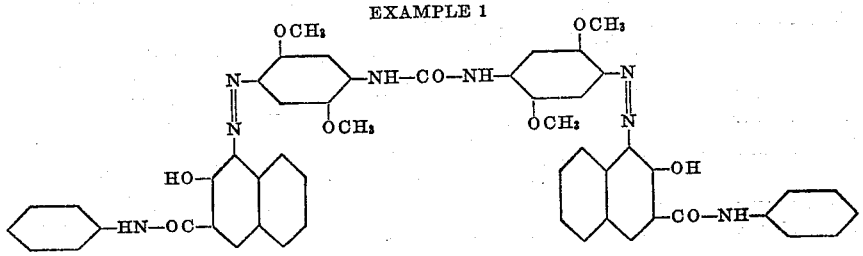

EXAMPLE 2

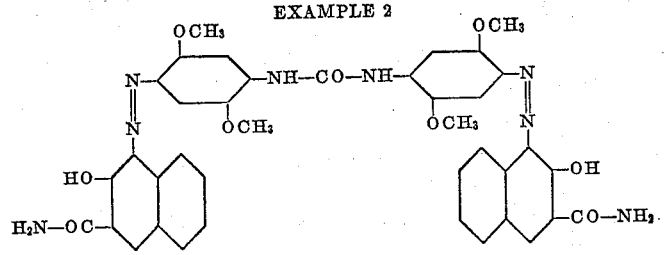

EXAMPLE 3

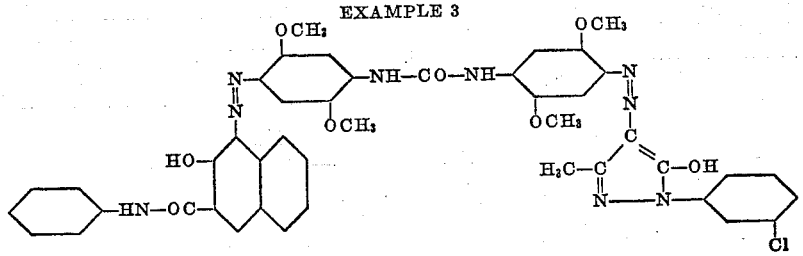

EXAMPLE 4

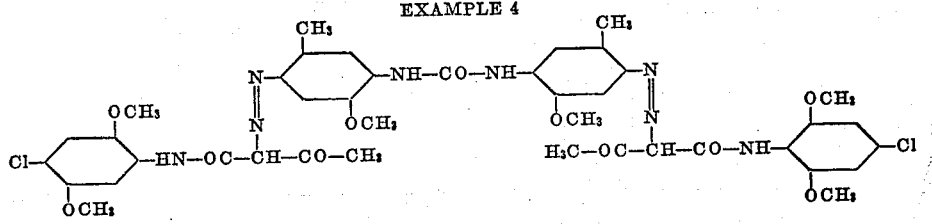

EXAMPLE 5

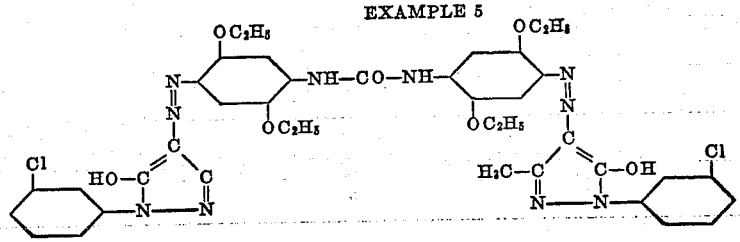

EXAMPLE 6

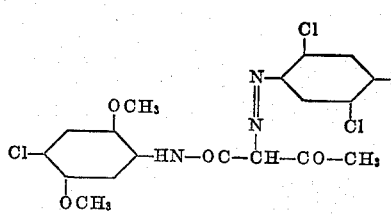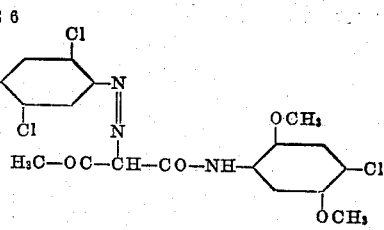

EXAMPLE 7

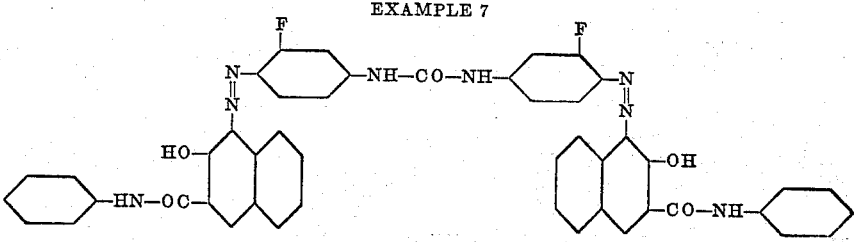

EXAMPLE 21

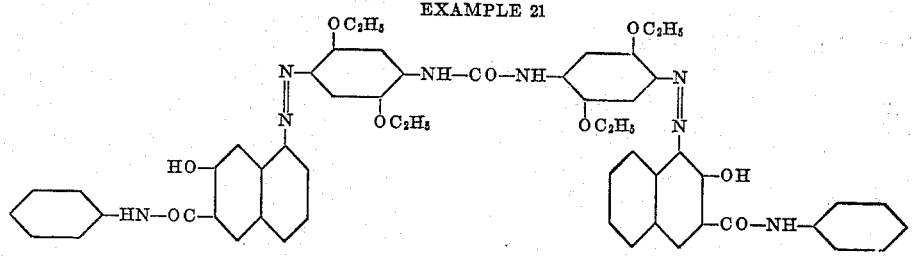

EXAMPLE 22

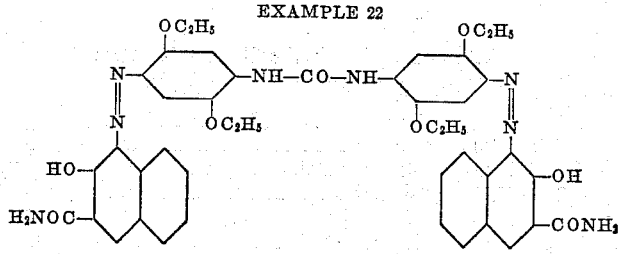

Having thus disclosed the invention what is claimed is:
1. A water insoluble disazo dyestuff which corresponds to the formula

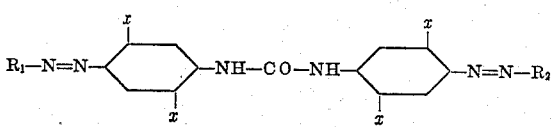

wherein each $x$ stands for a member selected from the group consisting of hydrogen, methyl, ethyl, methoxy, ethoxy and halogen, $R_1$ stands for the radial of an azo component which is free from water-solubilizing substituents and is coupled in ortho-position to a hydroxy group and is selected from the group consisting of azo components of the 2-hydroxynaphthalene-3-carboxylic acid-amide series, azo components of the acetoacetylaminobenzene and -naphthalene series and azo components of the 1-aryl-3-methyl-5-pyrazolone series, and wherein $R_2$ stands for the radial of an azo component which is free from water-solubilizing substituents and is coupled in ortho-position to a hydroxy group and is selected from the group consisting of azo components of the 2-hydroxynaphthalene-3-carboxylic acid-amide series, azo components of the acetoacetylaminobenzene and -naphthalene series and azo components of the 1-aryl-3-methyl - 5 - pyrazolone series.

2. The water-insoluble disazo dyestuff which corresponds to the formula

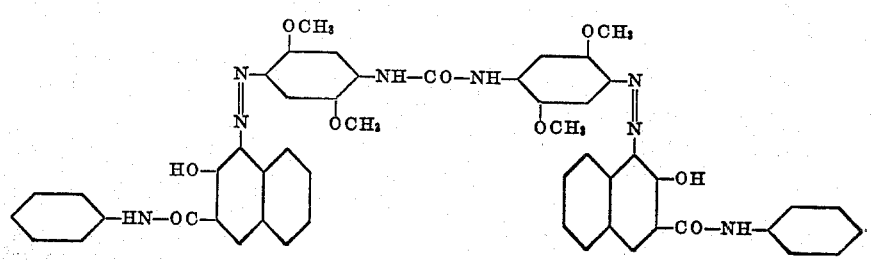

3. The water-insoluble disazo dyestuff which corresponds to the formula

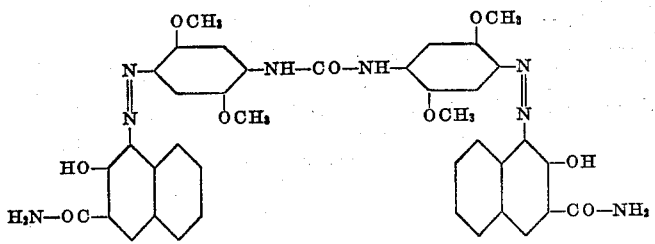

4. The water-insoluble disazo dyestuff which corresponds to the formula

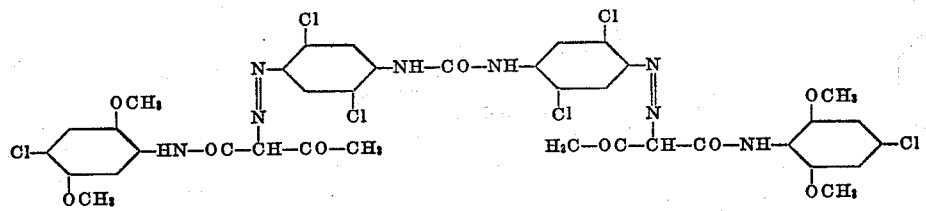

5. The water-insoluble disazo dyestuff which corresponds to the formula

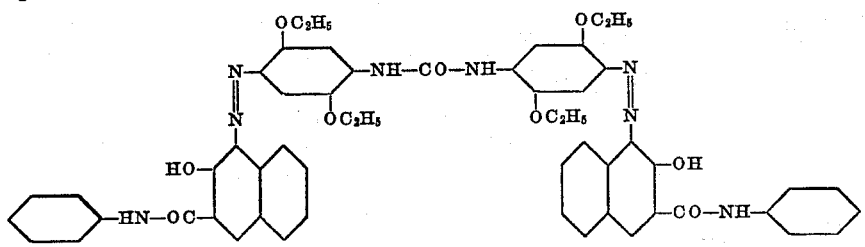

6. The water-insoluble disazo dyestuff which corresponds to the formula

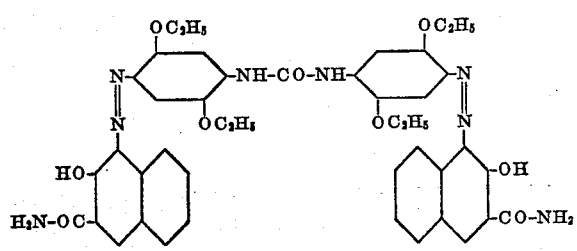

References Cited in the file of this patent

UNITED STATES PATENTS

| | | |
|---|---|---|
| 1,851,097 | Hentrich et al. | Mar. 29, 1932 |
| 1,851,120 | Stusser | Mar. 29, 1932 |
| 2,584,935 | Strobel et al. | Feb. 5, 1952 |
| 2,666,757 | Richter | Jan. 19, 1954 |
| 2,736,724 | Maderni | Feb. 28, 1956 |
| 2,741,657 | Schmid et al. | Apr. 10, 1956 |

FOREIGN PATENTS

| | | |
|---|---|---|
| 282,107 | Great Britain | Mar. 12, 1929 |
| 614,838 | Germany | Jan. 19, 1935 |
| 521,161 | Belgium | July 31, 1953 |

UNITED STATES PATENT OFFICE
CERTIFICATION OF CORRECTION

Patent No. 2,936,305            May 10, 1960

Willy Forter et al.

It is hereby certified that error appears in the above numbered patent requiring correction and that the said Letters Patent should read as corrected below.

Column 1, line 34, for "obatined" read -- obtained --; column 4, line 28, for "chaged" read -- charged --; column 6, Table 1, third column thereof and opposite "Example No. 29", for "-pyrozo-" read -- -pyrazo- --; same column 6, same Table 1, third column thereof and opposite "Example No. 36", for "-pryazo-" read -- -pyrazo- --; same column 6, same Table 1, third column thereof and opposite "Example No. 43", for "acid,benzylamide" read -- acid-benzylamide --; column 9, line 61, and column 10, line 54, for "radial", each occurrence, read -- radical --; columns 11 and 12, the right-hand portion of the formula in claim 4 should appear as shown below instead of as in the patent:

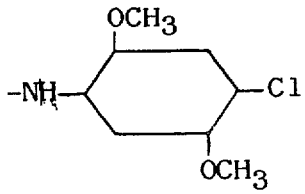

Signed and sealed this 9th day of May 1961.

(SEAL)
Attest:

ERNEST W. SWIDER
Attesting Officer

DAVID L. LADD
Commissioner of Patents